US010507702B2

(12) United States Patent
Azpiazu Echave et al.

(10) Patent No.: US 10,507,702 B2
(45) Date of Patent: Dec. 17, 2019

(54) SHOCK ABSORBER ASSEMBLY OF A SUSPENSION SYSTEM OF A VEHICLE AND SUSPENSION SYSTEM

(71) Applicant: CIKAUTXO, S.COOP., Berriatua (ES)

(72) Inventors: Iñaki Azpiazu Echave, Markina-Xemein (ES); Asier Celaya Arrizabalaga, Getaria (ES); Jon Plaza Gonzalez, Baracaldo (ES)

(73) Assignee: CIKAUTXO, S.COOP., Berriatua (ES)

( * ) Notice: Subject to any disclaimer, the term of this patent is extended or adjusted under 35 U.S.C. 154(b) by 29 days.

(21) Appl. No.: 15/705,491

(22) Filed: Sep. 15, 2017

(65) Prior Publication Data
US 2018/0001726 A1 Jan. 4, 2018

Related U.S. Application Data

(63) Continuation of application No. PCT/ES2016/070183, filed on Mar. 17, 2016.

(30) Foreign Application Priority Data

Mar. 18, 2015 (EP) .................................. 15382127

(51) Int. Cl.
B60G 11/24 (2006.01)
B60G 15/06 (2006.01)
F16F 1/373 (2006.01)

(52) U.S. Cl.
CPC ............ B60G 11/24 (2013.01); B60G 15/067 (2013.01); F16F 1/3732 (2013.01);
(Continued)

(58) Field of Classification Search
CPC .. F16F 1/3732; F16F 2230/007; F16F 1/3605; F16F 2230/02; F16F 1/38;
(Continued)

(56) References Cited

U.S. PATENT DOCUMENTS 3,179,444 A * 4/1965 Lansky .................... F16J 13/12
285/308
4,462,608 A * 7/1984 Lederman ............ B60G 15/068
267/220
(Continued)

FOREIGN PATENT DOCUMENTS

DE 102005031012 A1 1/2007
DE 102007012070 A1 9/2008
(Continued)

OTHER PUBLICATIONS

European Search Report on corresponding European Patent Application No. 15382127.7, dated Sep. 23, 2015.
(Continued)

Primary Examiner — Bradley T King
Assistant Examiner — Mahbubur Rashid
(74) Attorney, Agent, or Firm — Edell, Shapiro & Finnan, LLC.

(57) ABSTRACT

Suspension system of a vehicle and a shock absorber assembly of the suspension system, the shock absorber assembly includes a top mount and a jounce bumper. The jounce bumper includes a main body made of an elastic material, such as a foam elastomer or rubber and a fixing element made of a second harder material. The fixing element has a wall portion that extends around the outermost upper part of the main body and at least one elastic retaining area cooperating with a respective protuberance arranged in the top mount to fix the jounce bumper to the top mount. Between the outermost upper part of the main body and the fixing element there is a gap that enables the main body to expand radially also in the area covered by the wall portion of the fixing element when the main body is compressed during use.

16 Claims, 6 Drawing Sheets

(52) U.S. Cl.
CPC .. *B60G 2202/143* (2013.01); *B60G 2204/125* (2013.01); *B60G 2204/45021* (2013.01)

(58) Field of Classification Search
CPC ............. F16F 9/0463; B60G 2202/143; B60G 13/003; B60G 2204/143; B60G 11/24; B60G 15/067; B60G 2204/128
See application file for complete search history.

(56) References Cited

U.S. PATENT DOCUMENTS

| | | | | |
|---|---|---|---|---|
| 4,721,325 | A * | 1/1988 | Mackovjak | B60G 13/006 267/33 |
| 4,804,169 | A * | 2/1989 | Hassan | B60G 15/068 267/220 |
| 4,805,886 | A * | 2/1989 | Hassan | B60G 15/068 267/220 |
| 5,257,730 | A * | 11/1993 | Nakaura | F16F 3/093 267/140.3 |
| 5,308,104 | A * | 5/1994 | Charles | B60G 11/52 267/220 |
| 5,342,139 | A * | 8/1994 | Hoffman | B60G 7/001 267/219 |
| 5,467,970 | A | 11/1995 | Ratu et al. | |
| 5,467,971 | A * | 11/1995 | Hurtubise | B60G 15/068 188/322.12 |
| 6,267,512 | B1 | 7/2001 | Beghini et al. | |
| 6,296,237 | B1 * | 10/2001 | Nagai | B60G 7/04 267/140 |
| 6,948,728 | B2 * | 9/2005 | Pflugner | B60G 15/00 267/220 |
| 6,964,231 | B1 * | 11/2005 | Robinson | F42C 15/26 102/231 |
| 7,070,157 | B2 * | 7/2006 | Huprikar | F16F 1/37 248/560 |
| 7,077,248 | B2 * | 7/2006 | Handke | B60G 15/068 188/321.11 |
| 7,338,040 | B2 * | 3/2008 | Schleck | F16F 9/58 267/220 |
| 7,347,414 | B2 * | 3/2008 | Groves | B60G 3/20 267/220 |
| 7,416,175 | B2 * | 8/2008 | Al-Dahhan | E03C 1/0403 285/8 |
| 8,276,894 | B2 * | 10/2012 | Dickson | B60G 11/52 267/116 |
| 8,616,538 | B2 * | 12/2013 | Al-Dahhan | B60G 11/15 267/220 |
| 2006/0043659 | A1 * | 3/2006 | Gofron | B60G 7/04 267/220 |
| 2006/0113718 | A1 * | 6/2006 | Love | B60G 7/04 267/292 |
| 2006/0279031 | A1 | 12/2006 | Schleck et al. | |
| 2008/0054536 | A1 | 3/2008 | Lamb | |
| 2008/0136076 | A1 * | 6/2008 | Cummings | B60G 11/52 267/116 |
| 2010/0127437 | A1 | 5/2010 | Stevens et al. | |
| 2012/0292842 | A1 | 11/2012 | Van Der Zyppe et al. | |
| 2013/0020794 | A1 * | 1/2013 | Stokes | E03C 1/0403 285/8 |
| 2013/0307204 | A1 * | 11/2013 | Patil | B60G 15/07 267/220 |
| 2013/0328255 | A1 | 12/2013 | Geisler et al. | |
| 2014/0239567 | A1 | 8/2014 | Suchta et al. | |
| 2015/0258870 | A1 * | 9/2015 | Gollapalli | B60G 11/22 280/124.108 |
| 2016/0016342 | A1 * | 1/2016 | Al-Dahhan | B29C 44/569 267/292 |

FOREIGN PATENT DOCUMENTS

| | | |
|---|---|---|
| EP | 0249369 A1 | 12/1987 |
| EP | 0602330 B1 | 2/1996 |
| EP | 2255980 A1 | 12/2010 |
| EP | 2669544 A1 | 12/2013 |
| ES | 2083240 T3 | 4/1996 |
| JP | 1997303457 A | 11/1997 |

OTHER PUBLICATIONS

International Search Report in corresponding PCT Application No. PCT/ES2016/070183, dated Jun. 9, 2016.

* cited by examiner

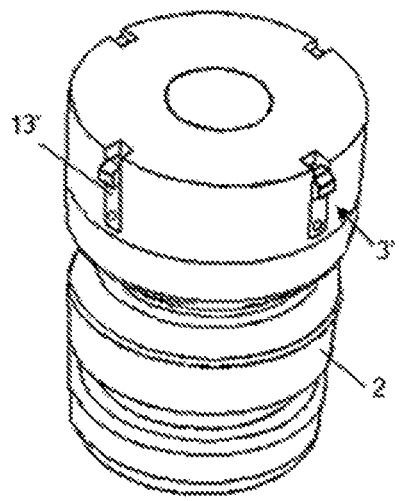
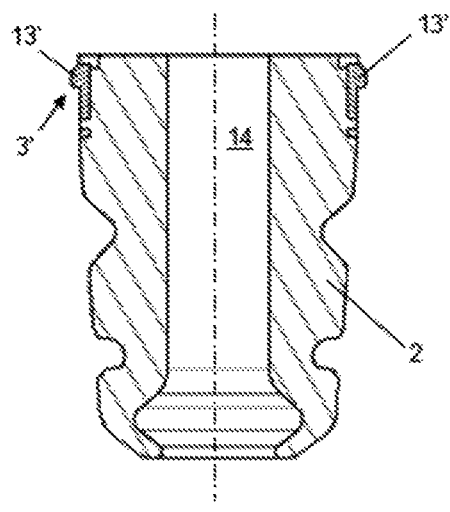
Fig. 9A  Fig. 9B
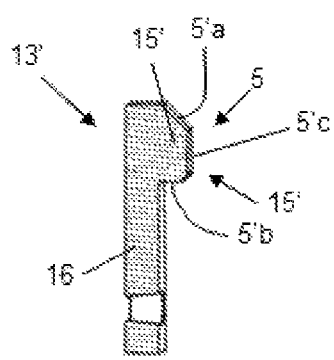
Fig. 10

SHOCK ABSORBER ASSEMBLY OF A SUSPENSION SYSTEM OF A VEHICLE AND SUSPENSION SYSTEM

CROSS-REFERENCE TO RELATED APPLICATIONS

This application is a continuation of International Application No. PCT/ES2016/070183, filed Mar. 17, 2016, which claims the benefit and priority to European Application No. 15382127.7, filed Mar. 18, 2015, of which both incorporated herein by reference in their entirety.

TECHNICAL FIELD

The present invention relates to suspension systems, and more specifically to shock absorber assemblies comprised in said suspension systems that damp and absorb irregularities of the terrain on which the vehicle is traveling.

BACKGROUND

Vehicles, such as cars, trucks, motorcycles, etc., are equipped with a suspension system that is made up of an assembly of elements that absorb irregularities of the terrain on which the vehicle is traveling in order to increase vehicle comfort and control. The suspension system acts between the chassis and wheels, which directly receive the irregularities of the surface being traveled on.

A suspension system usually comprises a shock absorber, with its corresponding rod or shaft, and there being assembled in said rod, for example, a spring, a top mount for attaching the suspension system to the vehicle chassis, and a jounce bumper compressible for absorbing vibrations and irregularities of the terrain, recovering its initial shape once irregularities of the terrain or vibrations have ceased.

In this regard, document EP249369 A1 discloses a suspension system for a vehicle comprising a metal top mount for attaching the suspension system to the vehicle chassis and a jounce bumper manufactured in polyurethane foam. The upper end of the jounce bumper comprises a neck having a small diameter in which an annular groove is provided. The lower portion of the top mount is fitted in said annular groove.

US20130328255 A1 discloses a suspension system for a vehicle comprising a metal top mount and a jounce bumper comprising a main body manufactured in a deformable material and a cup formed of a second deformable material, which provides the flexibility of rubber, the strength of plastic and the processibility of thermoplastic, as for example DupontHYTREL® or thermoplastic urethane. The cup comprises a wall portion extending around the outermost upper part of the main body and a retaining area that cooperates with a respective protuberance arrange in the top mount.

SUMMARY OF THE DISCLOSURE

According to one implementation a shock absorber assembly is provided that comprises a top mount and a jounce bumper comprising a main body manufactured in an elastic material, preferably a foam elastomer or rubber, and a fixing element manufactured in a second material that is harder than the material of the main body. The fixing element comprises a wall portion that extends around the outermost upper part of the main body and at least one elastic retaining area that cooperates with a respective protuberance arranged in the top mount to fix the jounce bumper to the top mount. Between said outermost upper part of the main body and the fixing element there is gap, so that the main body is expandable radially also in the area covered by the wall portion of the fixing element when the main body is compressed during use.

Since the jounce bumper has at least one retaining area made of a material that is harder than the material of the main body, correct assembly of the jounce bumper in the top mount can be assured, and therefore correct operation of the suspension system of the vehicle is assured.

Likewise, it is also assured that both parts, i.e., the top mount and the jounce bumper, are attached or fixed to one another so that during use both parts do not become decoupled. However, if necessary, it is possible to manually disassemble said parts, which is particularly advantageous for replacing a deteriorated part, such as the jounce bumper, for example.

On the other hand, the correct assembly of the jounce bumper is assured without sacrificing the deformation behavior of the main body since the radial expansion of the main body is not limited by the fixing element.

These and other advantages and features will become evident in the view of the drawings and the detailed description.

BRIEF DESCRIPTION OF THE DRAWINGS

FIG. 9A shows a perspective view of another embodiment of the jounce bumper.

FIG. 9B shows a sectional view of the jounce bumper of FIG. 9A.

FIG. 10 shows a sectional view of the tab of the fixing element of the jounce bumper of FIG. 9A.

DETAILED DESCRIPTION

Figure 1A:
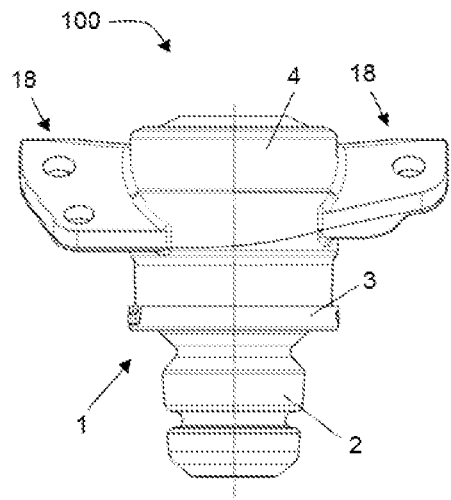
FIG. 1A shows a first perspective view of an embodiment of A shock absorber assembly according to one embodiment.
Figure 1B:
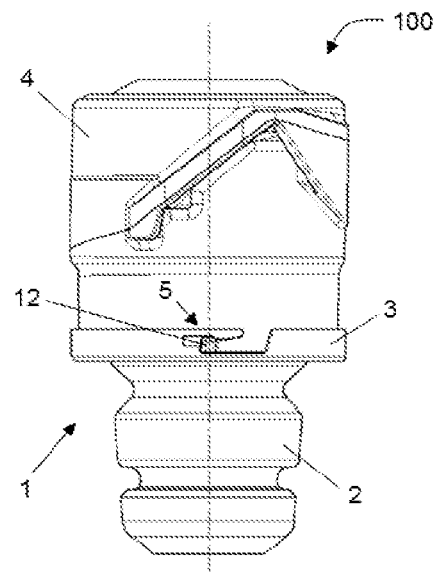
FIG. 1B shows a second perspective view of the shock absorber assembly of the embodiment of FIG. 1A.

FIGS. 1A and 1B show the shock absorber assembly 100 according to one embodiment. As shown in said drawings, the shock absorber assembly 100 comprises a top mount 4 and a jounce bumper 1. Generally, the top mount 4 is usually made of metal, although it can also be manufactured in aluminum, resistant plastic or any other resistant material, resistant being understood as a material the hardness of which measured on the Shore scale is within the D scale or higher. Jounce bumpers are usually manufactured in an elastic material the hardness of which measured on the Shore scale is usually within the A scale or lower, so that they may suitably perform their function. The jounce bumper 1 of the shock absorber assembly 100 comprises, in addition to a main body 2 manufactured in an elastic material (the hardness of which measured on the Shore scale will preferably be within the A scale or lower), a fixing element 3 manufactured in a second material that is harder than the material of the main body 2, comprising at least one elastic retaining area 5 cooperating with a respective protuberance 12 arranged in the top mount 4 to fix the jounce bumper 1 to the top mount 4 in a reliable and secure manner. This second material has a hardness which, measured on the Shore scale, is greater than the A scale, being preferably within the D scale or higher.

The main body 2 may be made of rubber or a foam elastomer, such as polyurethane foam, and the fixing element 3 is a resistant piece, which may be made of plastic. Correct assembly of the jounce bumper 1 in said top mount 4 is assured with the elastic retaining area 5 of the fixing element 3, and therefore correct operation of the suspension system of the vehicle is assured.

During the vehicle assembly process, the suspension system is usually assembled to generate a sub-assembly which is then attached to the rest of the vehicle through the top mount 4, i.e., the suspension system is attached to the vehicle chassis through said top mount 4. It is important for the jounce bumper 1 to be placed correctly in the top mount 4 for it to work correctly. When transporting vehicles to dealerships, the jounce bumper 1 and the top mount 4 are usually decoupled and an intermediate part is usually placed between both parts so that the suspension of the vehicle does not suffer during transport. Once the vehicle has reached its destination, the intermediate part is removed and the jounce bumper 1 is placed back in the top mount 4, with the drawback that this time the suspension system is already anchored to the vehicle chassis, complicating coupling maneuvers. This assembly is aided with the shock absorber assembly 100 of the invention, because even under these conditions correct assembly of the top mount 4 and the jounce bumper 1 is assured, as will become evident throughout the description.

Likewise, the shock absorber assembly 100 of the invention also assures that both parts, i.e., the top mount 4 and the jounce bumper 1, remain attached or fixed to one another so that they do not become decoupled during use. However, if necessary it is possible to manually disassemble said parts 4 and 1, which is particularly advantageous for replacing a deteriorated part, such as the jounce bumper 1, for example.

As is known, the top mount 4 is used for fixing the suspension system to the vehicle chassis. To that end, the top mount 4 comprises two side projections 18 comprising orifices for being able to be anchored to the chassis, which must be kept as stable as possible in order to provide the vehicle with the desired comfort. As discussed, the top mount 4 is usually metallic, for example made of steel, iron or aluminum, and is rigid enough to withstand the loads to which it is subjected. Optionally, the top mount 4 can also be made of plastic as previously described. In addition, the suspension system is constantly subjected to vibrations due to irregularities of the terrain, so in order to increase comfort and control of the vehicle, said system must absorb irregularities of the terrain on which said vehicle is traveling. To that end, the suspension system comprises the main body 2 which may be made of a foam elastomer material, such as polyurethane foam, although it can also be made of rubber, and which is more than 60% compressible, rapidly recovering its initial geometry when compressive loads cease. Said main body 2 is a very elastic but not very rigid part. In order for the suspension system to work correctly the jounce bumper 1 must be well-positioned with respect to the top mount 4.

Therefore, the shock absorber assembly 100 of the invention assures that both parts are correctly assembled, i.e., that the jounce bumper 1 is correctly positioned in the metallic top mount 4, thereby assuring correct operation of the suspension system of the vehicle, even in assembly conditions with scarce accessibility.

To assure correct assembly of the jounce bumper 1 and the top mount 4, the jounce bumper 1 comprises the fixing element 3 which is manufactured in a resistant material, preferably plastic material, the hardness of which measured on the Shore scale is greater than the A scale. Said plastic is preferably a thermoplastic polymer, such as, for example, polypropylene with or without fiber, polyamide 6 with or without fiber, polyamide 66 with or without fiber, polyamide 46 with or without fiber, polyphthalamide (PPA), polybutylene terephthalate (PBT), polyethylene (PE) or a combination thereof. It is also possible that it be made of aluminum or steel.

Figure 3:
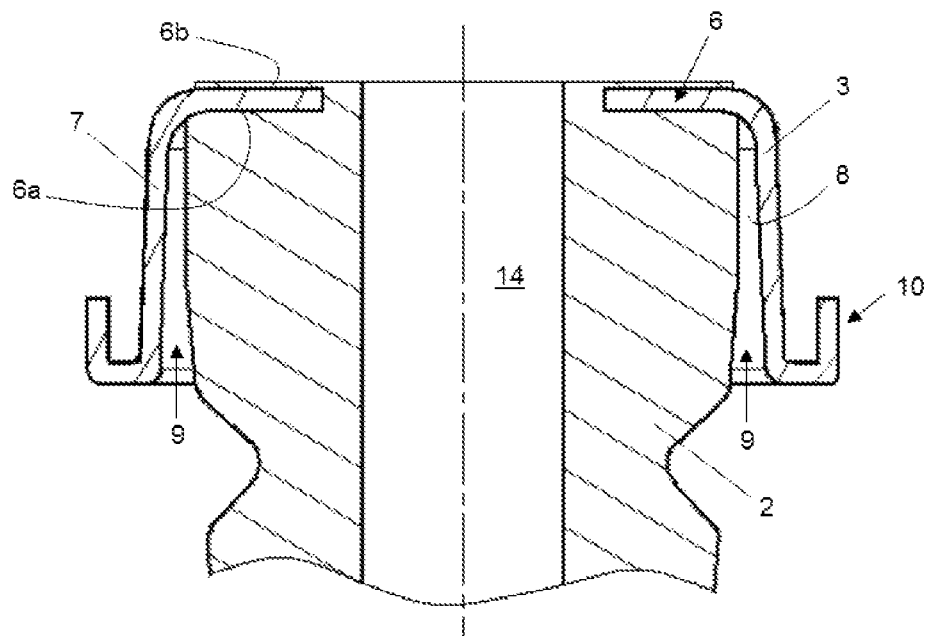
FIG. 3 shows a cutaway detail of the main body and the fixing element of the shock absorber assembly of the embodiment of FIG. 1A.

As shown in FIG. 3, the fixing element 3 comprises a wall portion 7 extending downward around the outermost upper part of the main body 2, so that a gap 9 is generated between the outermost upper part of the main body 2 and the fixing element 3. In this way, the main body 2 can be expand radially also in the area covered by the portion 7 of the fixing element 3 when the main body 2 is compress during use. This has the advantaged that the correct assembly of the jounce bumper 1 is assured without sacrificing the deformation behavior of the main body 2 since the radial expansion of the main body 2 is not limited by the fixing element 3.

Figure 2:
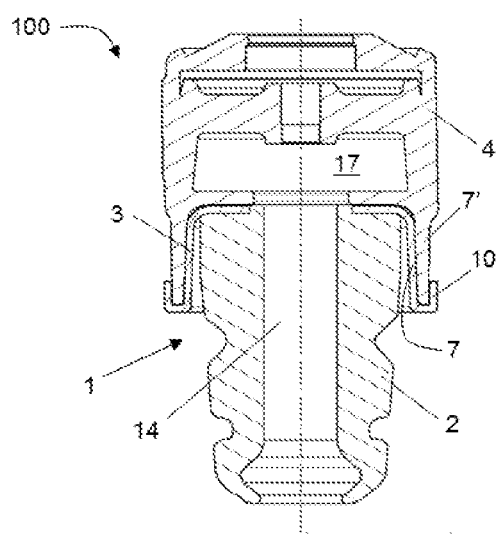
FIG. 2 shows a cutaway view of the shock absorber assembly of the embodiment of FIG. 1A.
Figure 4A:
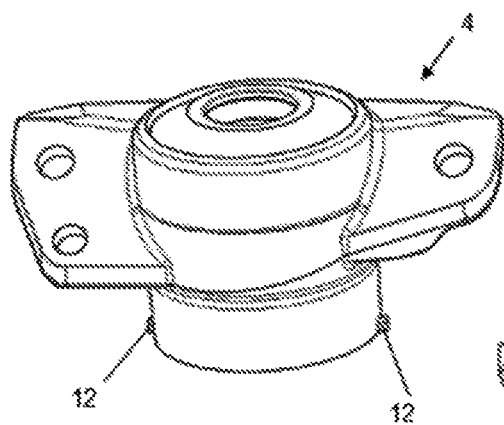
FIG. 4A shows a perspective view of the top mount of the shock absorber assembly of the embodiment of FIG. 1A.
Figure 4B:
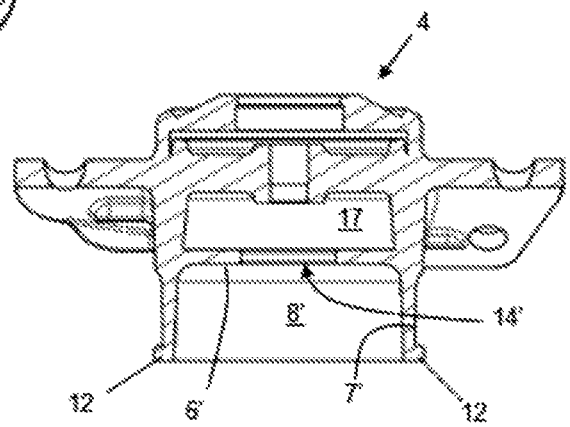
FIG. 4B shows a cutaway view of the top mount of FIG. 4A.
Figure 6:
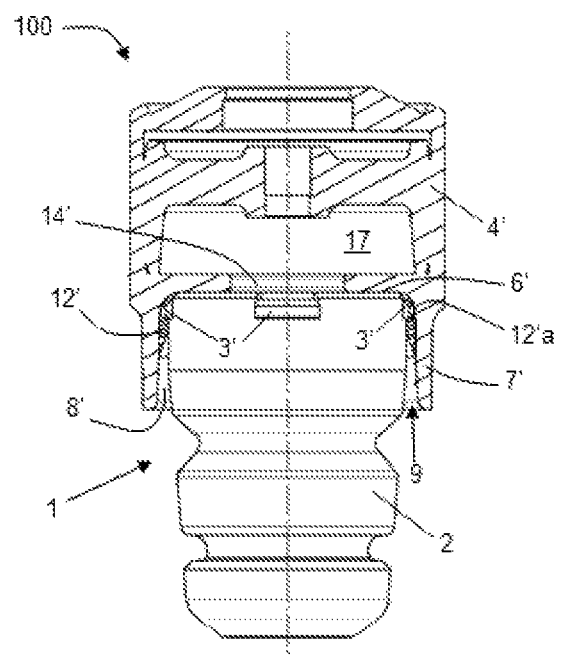
FIG. 6 shows a second embodiment of a shock absorber assembly in which a front view of the jounce bumper and a cutaway view of the top mount are shown.

As shown in FIG. 4B, according to one embodiment the top mount 4 comprises a compartment 8', preferably cylindrical, demarcating an inner cavity in the lower area. The upper portion of the jounce bumper 1 is housed in said compartment 8' as shown in FIG. 2. The top mount 4' of a second embodiment, which will be described in detail below, also comprises said compartment 8' in the lower area and the jounce bumper 1 is also housed in said compartment 8' as shown in FIG. 6.

As shown in FIG. 2, the compartment 8' comprises a sidewall 7' that surrounds the wall portion 7 of the fixing element 3.

According to any of the two embodiments of the top mount 4 or 4', said compartment 8' comprises a seating area 6' where the side wall 7' extends downwards, as seen in the example of FIG. 4B. Said wall 7', as well as the wall portion 7 of the fixing element 3, comprises the draft angle necessary for its manufacture.

According to one embodiment of the top mount 4 comprises two protuberances 12 that are arranged in the sidewall 7' of the top mount 4, preferably equidistantly, although it can comprise more than two protuberances 12, which can be arranged equidistantly or not. As shown in FIG. 1B, 4A or 4B, said protuberances 12 are arranged on the outer face of said wall 7'. In contrast, the second embodiment of the top mount 4' comprises a ring-shaped protuberance 12' that is also arranged in said sidewall 7' but on the inner face, as shown in FIG. 6.

According to one embodiment, the fixing element 3 comprises, as many retaining areas 5 as there are protuberances 12, arranged in a manner similar to the protuberances 12 of the top mount 4 so that they can cooperate with one another. According to one embodiment, the fixing element 3 comprises two retaining areas 5 arranged equidistantly in the perimetral area of the jounce bumper 1. However, in the second embodiment of the top mount 4' where the protuberance 12' is ring-shaped, the corresponding fixing element 3' can comprise as many retaining areas 5' are desired. In the example of FIGS. 6 to 10, the fixing element 3' comprises four retaining areas 5' arranged equidistantly in the perimetral area of the jounce bumper 1, specifically in the upper portion of the jounce bumper 1.

According to one embodiment the fixing element 3 is cup-shaped and comprises an inner cavity 8, preferably substantially cylindrical, demarcated by a base 6 and the wall portion 7, the base 6 cooperating with the seating area 6' of the top mount 4 and the wall portion 7 extending downwardly. Part of the main body 2 is housed inside said cavity 8, the gap 9 being located in said cavity 8.

According to one embodiment the wall portion 7 of the fixing element 3 comprises a perimetral rim 10, preferably U-shaped, in the lower portion in which the end of the side wall 7' of the top mount 4 is housed, as shown in FIG. 2. In this way, the cutting burr, which usually is formed due to the manufacturing process of the top mount 4 and being usually located in the said wall 7' of the top mount 4, is protected by the fixing element 3, so that any damage of the main body 2 caused by said burr is avoided. During use, the main body 2 is deformed and part of the material tends to expands towards the sidewall 7' of the top mount 4 so that if the burr is not protected it can damage the main body 2.

According to some embodiments, the retaining areas 5 of the fixing element 3 are arranged in the perimetral outermost area of the jounce bumper 1, i.e. in the wall portion 7 of said fixing element 3, preferably in the rim 10, as seen in FIG. 1B.

According to one embodiment the rim 10 comprises at least one opening 11 to allow passage of a protuberance 12 of the top mount 4. There are as many openings 11 as there are protuberances 12, therefore there are two openings 11 arranged equidistantly in the rim 10. Each opening 11 comprises a stop 11a interacting with the protuberance 12 of the corresponding top mount 4, and said opening 11 is demarcated in the upper portion by an elastic retaining area 5, as shown in the detail of FIG. 5.

Figure 5:
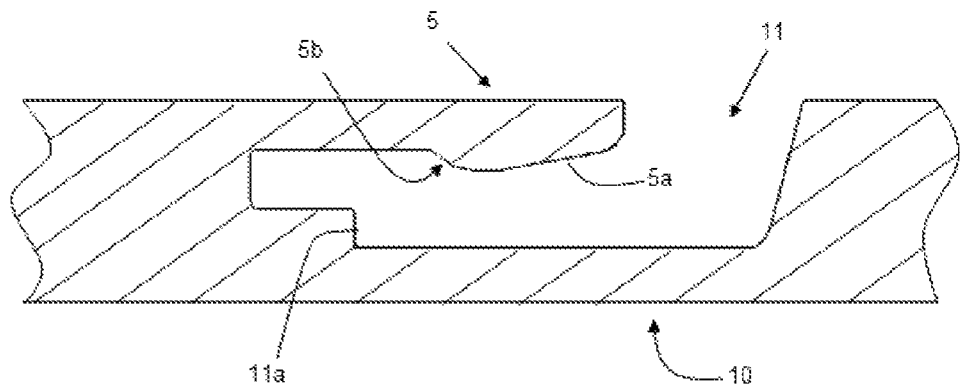
FIG. 5 shows a detail of the rim of the fixing element of the shock absorber assembly of the embodiment of FIG. 1A.

According to one embodiment, each retaining area 5 comprises a retaining flange 5a, which is in a standby position in its normal state, and a clearance area 5b, as shown in FIG. 5.

After introducing the corresponding protuberance 12 of the top mount 4 in the opening 11 of the jounce bumper 1, a small rotation of the jounce bumper 1 is performed. The flange 5a of each retaining area 5 comprises a progressive inclined surface with an angle comprised between 0° and 90°, so in its path, due to rotation of the jounce bumper 1, the flange 5a is moved away from its standby position by the corresponding protuberance 12. The clearance area 5b of each flange 5a comprises an inclined surface with an obtuse angle. When the protuberance 12 reaches the clearance area 5b, the flange 5a returns to the standby position, generating a clamping between the protuberance 12 of the top mount 4 and the elastic retaining area 5, such that a small clicking sound is generated which the assembly operator can hear, while at the same time an action-reaction also occurs (action—the flange 5a moves away from the standby area, reaction—the flange 5a returns to the standby position) which can be noticed by the assembly operator. This reaction and this sound occur during clamping as a result of two rigid parts (metal-plastic, preferably thermoplastic polymer) interacting, instead of a rigid part and another non-rigid part, as would be the case if the fixing element 3 was not added and the main body 2, which will be made of polyurethane foam, for example, was attached to the top mount 4. Therefore, each protuberance 12 of the top mount 4 is retained after assembly between the stop 11a of the corresponding opening 11 and the flange 5a of the corresponding retaining area 5.

As described in detail in the preceding paragraph, the clamping that is generated between the top mount 4 and the jounce bumper 1 can be felt and heard by a snap, therefore the assembly operator knows with certainty that both parts have been correctly assembled, assuring correct operation of the suspension system. Furthermore, the shock absorber assembly 100, clamping between the top mount 4 and the jounce bumper 1 is also visual because the attachment between both parts occurs on the outer face of the wall 7' of the top mount 4, as seen in FIG. 1B, therefore, the assembly operator can also visually know if the assembly of both parts 4 and 1 has been performed correctly.

According to one embodiment, the main body 2 covers both the lower surface 6a and the upper surface 6b of the base 6 of the fixing element 3, as can be seen in FIG. 3. The fact that the upper surface 6b of the base 6 of the fixing element 3 is covered by a soft material, such as polyurethane foam, prevents unwanted noise from being generated during use of the suspension element in the vehicle due to friction between two rigid parts, i.e., between the seating area 6' of the top mount 4 which is metallic and the base 6 of the fixing element 3 which is made of a rigid plastic if the upper surface 6b is not covered by the main body 2. The polyurethane foam projecting from the upper surface 6b actually does not have to be very thick, a fine coat concealing the material of the fixing element 3 is sufficient. According to one embodiment only the lower surface 6a of the base 6 of the fixing element 3 is covered by the material of the main body.

According to one embodiment the seating area 6' of the top mount 4 and the jounce bumper 1 comprise a central hole 14' and 14 respectively, the central hole 14' of the seating area 6' of the top mount 4 comprising a larger diameter than the central hole 14 of the jounce bumper 1. The shock absorber assembly 100 is assembled on a rod, not shown in the drawings, of a shock absorber of the suspension system of a vehicle through the central hole 14 of the jounce bumper 1. Likewise, the base 6 of the fixing element 3 also comprises a central hole with a larger diameter than the diameter of the central hole 14' of the seating area 6' of the top mount 4, such that at least part of the main body 2 emerges below the central hole 14' of the top mount 4, as shown in FIG. 2, such that the main body 2 can deform and flow through said central hole 14' of the top mount 4 into an inner cavity 17 arranged in the upper portion of the top mount 4 and in communication with said central hole 14' to allow correct compression of the main body 2, i.e., deformation of the body 2 due to the compressive forces being generated during use of the vehicle.

Figure 7:
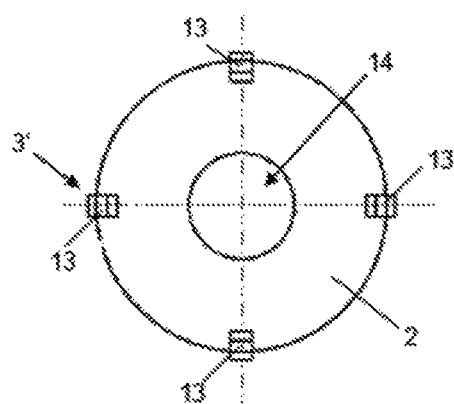
FIG. 7 is a plan view of the jounce bumper of the shock absorber assembly of FIG. 6.

A second embodiment of the shock absorber assembly 100, which differs from the previously described embodiment in the fixing element 3', the arrangement of the protuberances 12' of the top mount 4' and the gap 9, the fixing element 3' comprises at least one tab, two embodiments 13 and 13' of which are shown, housed in the outer side surface of the upper portion of the main body 2, as shown in FIG. 6, 9A or 9B. In a non-limiting example of this second embodiment, the fixing element 3' comprises four tabs, according to the embodiment of the tabs 13 shown in FIGS. 8A and 8B, as shown in FIG. 7, or according to the embodiment of the tabs 13' shown in FIGS. 9A, 9B and 10. In said second embodiment of the shock absorber assembly 100, said tabs 13 or 13' are equidistantly arranged, i.e., at 90°, although they do not have to be arranged equidistantly and can comprise two, three, four or more tabs 13 or 13'.

Like in the shock absorber assembly 100 previously described, the top mount 4' of the second embodiment is metallic, although it can also be manufactured in aluminum, resistant plastic or any other resistant material, resistant being understood as a material the hardness of which measured on the Shore scale is within the D scale or higher, and the fixing element 3' of the second embodiment is also manufactured in a second resistant material, different from the main body 2, the hardness of which measured on the Shore scale is greater than the A scale, preferably being within the D scale or higher, preferably being made of plastic.

Each tab 13 or 13' comprises a head 15 or 15' projecting radially from the main body 2, the head 15 or 15' being the elastic retaining area 5'.

Figure 8A:
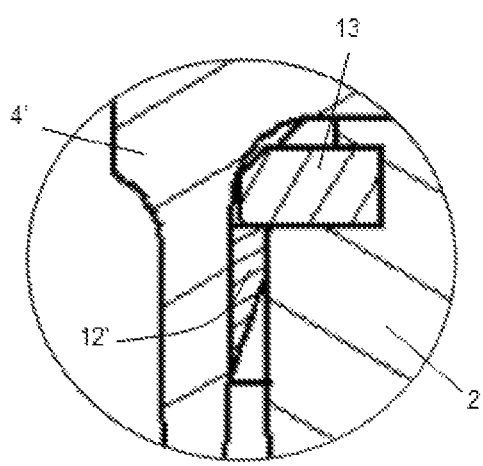
FIG. 8A shows a detail of the protuberance of the top mount and a first embodiment of a tab of the fixing element of the shock absorber assembly of FIG. 6.
Figure 8B:
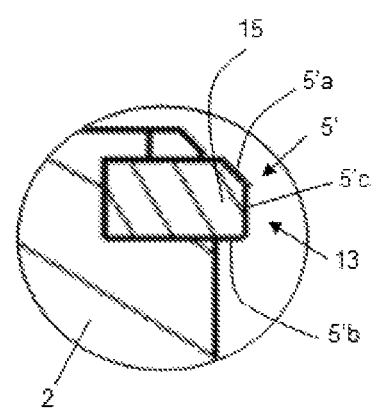
FIG. 8B shows another detail of the first embodiment of a tab of the fixing element of the shock absorber assembly of FIG. 6.

FIGS. 8A and 8B show the first embodiment of the tab 13 and FIGS. 9A, 9B and 10 show the second embodiment of the tab 13', where the only difference between both tabs 13 and 13' is that the head 15' of the tab 13' of the second embodiment extends over a leg 16, the width of said leg 16 being less than the width of the head 15'.

The head 15 or 15' according to any of the two embodiments of the tabs 13 or 13' comprises an angular surface 5'$a$ and a stop surface 5'$b$ arranged such that it faces the angular surface 5'$a$ and projects radially from the main body 2. A nose 5'$c$ is arranged between the angular surface 5'$a$ and the stop surface 5'$b$ to join both surfaces 5'$a$ and 5'$b$ to one another.

As already discussed above, the protuberance 12' of the top mount 4' of the second embodiment is circular ring-shaped and is arranged in the inner face of the sidewall 7' of the top mount 4'. The protuberance 12' comprises an angular surface cooperating with the angular surface 5'$a$ of the tab 13 or 13' during the clamping of both parts 12' and 3' to aid in clamping, and a support surface 12'$a$, preferably straight, cooperating with the stop surface 5'$b$ of the tab 13 or 13. Optionally, said protuberance 12' may comprise two, three or four angular portions arranged equidistantly in the inner face of the side wall 7'.

Each retaining area 5' and the protuberance 12' are manufactured in a more resistant material than the material of the main body 2, therefore, since two resistant elements 5' and 12' interact, i.e. the hardness of which measured on the Shore scale is greater than the A scale, correct assembly of the jounce bumper 1 in the top mount 4' is assured, and correct operation of the suspension system of the vehicle is therefore assured.

Upward movement of the jounce bumper 1 with respect to the top mount 4' is enough to attach and fix the top mount 4' and the jounce bumper 1 according to this second embodiment. The angular surface 5'$a$ of the tabs 13 or 13' slides over the angular surface of the protuberance 12', causing deformation of the retaining area 5' of the head 15 or 15' of the tabs 13 or 13' since it is more rigid (metallic) than the tabs 13 or 13' (plastic, preferably thermoplastic polymer), enabling the passage of the fixing element 3'. Once the fixing element 3' has gone through the protuberance 12', the head 15 or 15' of the tabs 13 or 13' runs into a clearance area in which the retaining area 5' recovers its original shape, so the stop surface 5$b$ of the retaining area 5' is retained by the support surface 12'$a$ of the protuberance 12', as shown in FIG. 6, generating the clamping between the protuberance 12' of the top mount 4' and the elastic retaining area 5', such that a small clicking sound is also generated that the assembly operator can hear, while at the same time the same action-reaction occurs like in the previously described embodiment. FIG. 6 shows a front view of the jounce bumper 1 and a cutaway view of the top mount 4' for better understanding.

In this second embodiment it is also possible to feel and hear the clamping that is generated between the top mount 4' and the jounce bumper 1, therefore the assembly operator knows with certainty that both parts 4' and 1 have been correctly assembled, assuring correct operation of the suspension system.

The gap for radial expansion of the main body 2 also exists in the second embodiment of the shock absorber assembly 100, but it is disposed between the top mount 4' and the jounce bumper 1 as can be seen in FIG. 6.

Likewise and like in the preferred embodiment, the top mount 4' and the jounce bumper 1 are fixed to one another such that during use of the suspension system of the vehicle said parts 4' and 1 are prevented from being able to become decoupled, also being possible to manually disassemble said parts 4' and 1 if necessary. In this way, the correct assembly of the jounce bumper 1 is assured without sacrificing the deformation behavior of the main body 2 since the radial expansion of the main body 2 is not limited by the fixing element.

Like in the case of the shock absorber assembly 100 of the embodiment previously described, the jounce bumper 1 of the second embodiment also comprises the central hole 14 to allow passage of the rod of the shock absorber of the suspension system. The seating area 6' of the top mount 4' of the second embodiment also comprises the central hole 14' which comprises a larger diameter than the central hole 14 of the jounce bumper 1, such that at least part of the main body 2 emerges below the central hole 14' of the top mount 4', as shown in FIG. 6. Therefore, in this embodiment the main body 2 can also deform and flow through said central hole 14' of the top mount 4' into the inner cavity 17 arranged in the upper portion of the top mount 4' and in communication with said central hole 14' to allow correct compression of the main body 2, i.e., deformation of the body 2 due to the compressive forces being generated during use.

Preferably the main body 2 is overmolded on the fixing element 3 or 3'.

Both the elastic retaining areas 5 of the first embodiment and the retaining areas 5' of the second embodiment are arranged in the outermost perimetral area of the jounce bumper 1.

The fixing element 3, as well as the fixing element 3', is attached to the main body 2 in an specific area 19. Said specific area 19 is defined as the zone, or zones, where the main body 2 remains undeformed when the main body 2 is compressed during use, i.e. neutral deformation zones, or at least in the zones of minimum deformation during use. To select those zones, i.e. the neutral and/or the minimum deformation zones, the behavior of the main body 2 is simulated. This allows not limiting, or limiting the less possible, the behavior of the main body 2 when the fixing element 3 or 3' is arranged. But to achieve this, a compromise between the top mount 4 or 4' and the fixing element 3 or 3' must be achieved.

In the first embodiment, for example, this compromise is achieved by reducing the thickness of the inner cavity 8' of the top mount 4, so that the dimension of the gap between the inner cavity 8' of the top mount and the outermost diameter of the main body of a shock absorber assembly of an embodiment not comprising a fixing element and the gap 9 of the invention is the same. Therefore, the shock absorber assembly 100 of the invention contributes to save material and to reduce weight.

The specific areas 19, as stated above, are defined as being the more stable dimensional areas of the main body 2, i.e., the areas that deform the least when said main body 2 is compressed during use. Behavior of the main body 2 is therefore not hindered, and the main body 2 is left to be able to freely deform when it is compressed during use, while at the same time preventing the position of the retaining areas 5 or 5' from changing such that said areas 5 or 5' remain as stable as possible during deformation of the main body 2, preventing the top mount 4 or 4' and the jounce bumper 1 from becoming decoupled.

In order to attach the main body 2 and the fixing element 3 or 3', an impregnating agent is previously coated to the fixing element 3 or 3' in the corresponding specific areas 19. Then, said fixing element 3 or 3' is introduced in a mold and, subsequently, the main body 2 is molded over the fixing element 3 or 3'. During the step of curing of the main body 2, only the specific areas 19 of the fixing element 3 or 3' react with the material of the main body 2, both parts 2 and 3 or 3' being attached only in said areas.

Figure 3A:
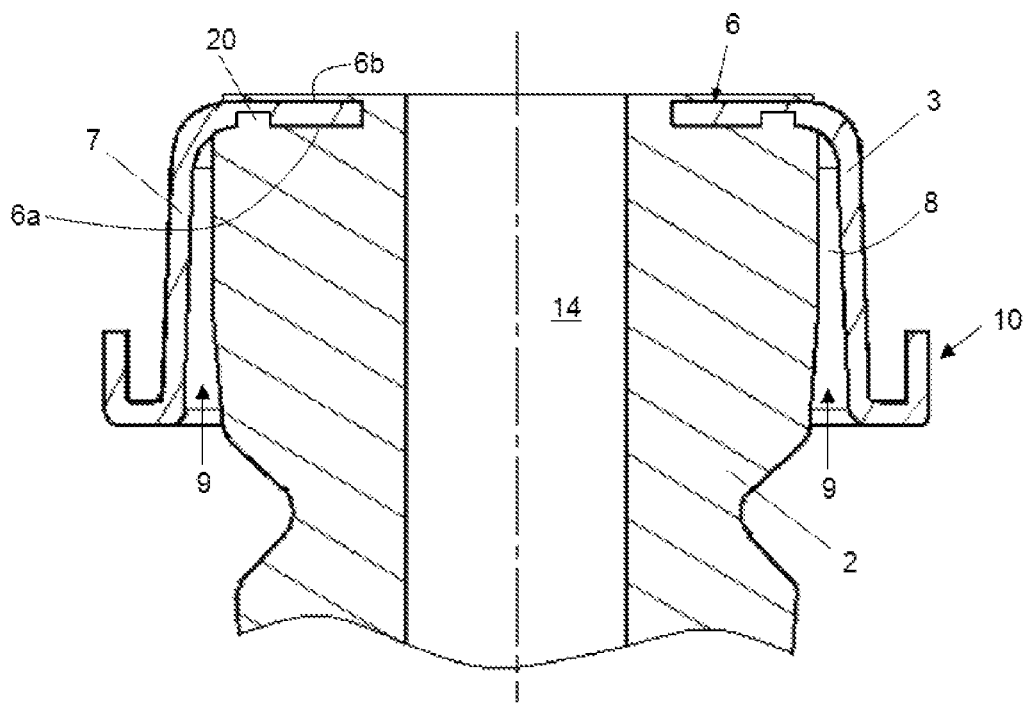
FIG. 3A shows a cutaway detail of the main body and the fixing element of the shock absorber assembly of another embodiment.

In order to help to set the impregnating agent, the fixing element 3 of the first embodiment comprises a recess 20, preferably ring shaped, located in the specific area 19, as can be seen in FIG. 3A.

Figure 3B:
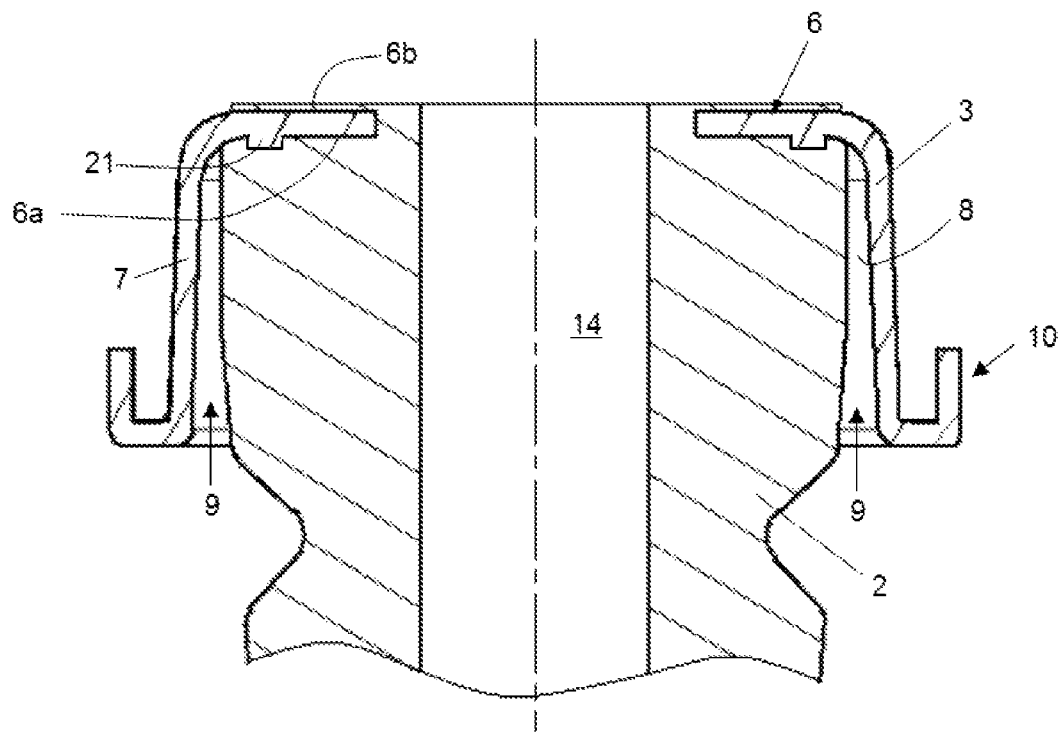
FIG. 3B shows a cutaway detail of the main body and the fixing element of the shock absorber assembly of another embodiment.

Alternatively, the fixing element 3 comprises a protrusion 21, preferably ring shaped, located in the specific area 19, as can be seen in FIG. 3B.

Figure 2A:
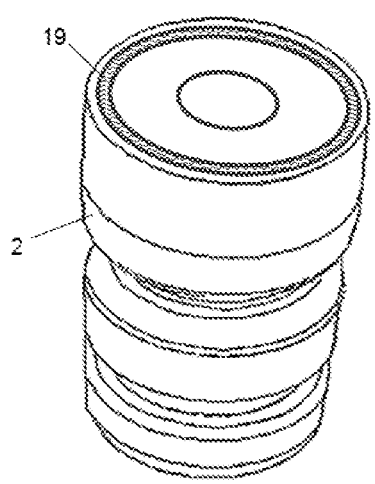
FIG. 2A shows a perspective view of the main body of the shock absorber assembly of the embodiment of FIG. 1A showing a specific area of the fixing element.

In the first embodiment, the specific areas 19 are located in a zone of the lower surface 6a of the base 6 of the fixing element 3, being preferably ring shaped as can be seen in FIG. 2A.

In the second embodiment however, the specific areas 19 are located in the perimetral upper outermost area of the main body 2.

The disclosure also relates to the suspension system of a vehicle comprising a shock absorber, not shown in the drawings, with its corresponding rod. As has already been discussed, the shock absorber assembly 100 according to any of the embodiments is assembled on said rod and is then attached to the vehicle chassis through the side projections 18 of the top mount 4 or 4'. The suspension system also comprises the remaining components necessary for said suspension system to work, such as springs, for example (not shown in the drawings).

What is claimed is:

1. A shock absorber assembly of a suspension system of a vehicle, the shock absorber comprising:

a top mount that includes a radially extending protuberance; and a jounce bumper that includes a main body made of an elastic material and a fixing element made of a material that is harder than the elastic material of the main body, the fixing element including a wall that extends at least partially around an outer circumference of an upper part of the main body, the fixing element having an elastic retaining area configured to cooperate with the top mount protuberance to fix the jounce bumper to the top mount, there being a gap between the outer circumference of the upper part of the main body and the wall of the fixing element to enable the main body to expand radially outward toward the fixing element wall when the main body is compressed during use;

a bottom part of the top mount including a compartment in which the upper part of the main body of the jounce bumper resides, the compartment including a sidewall that is at least partially surrounded by the wall of the fixing element, the retaining area being arranged in a perimetral outermost area of the jounce bumper and the protuberance of the top mount being arranged on the sidewall of the compartment, the wall of the fixing element including a perimetral rim in which at least a part of the compartment sidewall is housed, the perimetral rim being U-shaped and located at a lower end of the fixing element.

2. The shock absorber assembly according to claim 1, wherein the main body is overmolded on the fixing element.

3. The shock absorber assembly according to claim 2, wherein the fixing element includes an area coated by an impregnating agent, the area being a neutral deformation or a minimum deformation zones.

4. The shock absorber assembly according to claim 3, wherein the area coated by the impregnating agent comprises a recess.

5. The shock absorber assembly according to claim 4, wherein the recess is ring shaped.

6. The shock absorber assembly according to claim 3, wherein the area comprises a protrusion.

7. The shock absorber assembly according to claim 6, wherein the protrusion is ring shaped.

8. The shock absorber assembly according to claim 1, wherein the elastic retaining area is arranged in the perimetral rim.

9. The shock absorber assembly according to claim 1, wherein the fixing element is cup-shaped and comprises an inner cavity demarcated by a base and the wall of the fixing element.

10. The shock absorber assembly according to claim 1, wherein the material of the fixing element has a Shore hardness that is greater than a maximum Shore hardness in the Shore A hardness scale.

11. The shock absorber assembly according to claim 1, wherein the material of the fixing element has a Shore hardness that is within the Shore hardness D scale or greater than a maximum Shore hardness in the Shore D hardness scale.

12. The shock absorber assembly according to claim 1, wherein the material of the fixing element is a thermoplastic polymer selected from the group consisting of polypropylene with or without fiber, polyamide 6 with or without fiber, polyamide 66 with or without fiber, polyamide 46 with or without fiber, polyphthalamide, polybutylene terephthalate, polyethylene, aluminium and steel.

13. A shock absorber assembly of a suspension system of a vehicle, the shock absorber comprising:

a top mount that includes a radially extending protuberance; and a jounce bumper that includes a main body made of an elastic material and a fixing element made of a material that is harder than the elastic material of the main body, the fixing element including a wall that extends at least partially around an outer circumference of an upper part of the main body, the fixing element having an elastic retaining area configured to cooperate with the top mount protuberance to fix the jounce bumper to the top mount, there being a gap between the outer circumference of the upper part of the main body and the wall of the fixing element to enable the main body to expand radially outward toward the fixing element wall when the main body is compressed during use;

a bottom part of the top mount including a compartment in which the upper part of the main body of the jounce bumper resides, the compartment including a sidewall that is at least partially surrounded by the wall of the fixing element, the retaining area being arranged in a perimetral outermost area of the jounce bumper and the protuberance of the top mount being arranged on the sidewall of the compartment, the wall of the fixing element including a perimetral rim in which at least a part of the compartment sidewall is housed, the perimetral rim including an opening to allow passage of the protuberance of the top mount, the top mount protuberance being arranged on an outer face of the sidewall of the compartment, the perimetral rim opening being at least partially demarcated by the elastic retaining area.

14. A shock absorber assembly of a suspension system of a vehicle, the shock absorber comprising:

a top mount that includes a radially extending protuberance; and a jounce bumper that includes a main body made of an elastic material and a fixing element made of a material that is harder than the elastic material of the main body, the fixing element including a wall that extends at least partially around an outer circumference of an upper part of the main body, the fixing element having an elastic retaining area configured to cooperate with the top mount protuberance to fix the jounce bumper to the top mount, there being a gap between the outer circumference of the upper part of the main body and the wall of the fixing element to enable the main body to expand radially outward toward the fixing element wall when the main body is compressed during use;

a bottom part of the top mount including a compartment in which the upper part of the main body of the jounce bumper resides, the compartment including a sidewall that is at least partially surrounded by the wall of the fixing element the retaining area being arranged in a perimetral outermost area of the jounce bumper and the protuberance of the top mount being arranged on the sidewall of the compartment the wall of the fixing element including a perimetral rim in which at least a part of the compartment sidewall is housed an opening of the perimetral rim being demarcated by a stop, the protuberance of the top mount being retained between the stop and the elastic retaining area.

15. A shock absorber assembly of a suspension system of a vehicle, the shock absorber comprising:

a top mount having a bottom part that includes a compartment, the compartment including a sidewall having an inner face, the inner face having a protuberance; and a jounce bumper that includes a main body made of an elastic material, an upper part of the main body residing in the top mount compartment, the jounce bumper further including a fixing element made of a material that is harder than the elastic material of the main body, the fixing element including a tab located on an outer side surface of the upper part of the main body, the tab comprising a head projecting radially outward from the main body, the head including an elastic retaining area that cooperates with the protuberance to fix the jounce bumper to the top mount, the fixing element comprising a plurality of tabs arranged equidistant to one another on the outer side surface of the upper part of the main body, and the top mount including a respective plurality of protuberances cooperating with the plurality of tabs to fix the jounce bumper to the top mount.

16. The shock absorber assembly according to claim 15, wherein the tab of the fixing element comprises a leg on which the head extends.

* * * * *